US011435989B2

(12) United States Patent
Wrighton et al.

(10) Patent No.: US 11,435,989 B2
(45) Date of Patent: Sep. 6, 2022

(54) THREAD-LOCAL RETURN STRUCTURE FOR ASYNCHRONOUS STATE MACHINE

(71) Applicant: Microsoft Technology Licensing, LLC, Redmond, WA (US)

(72) Inventors: David Charles Wrighton, Redmond, WA (US); Jan Kotas, Redmond, WA (US); Stephen Harris Toub, Winchester, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/002,579

(22) Filed: Aug. 25, 2020

(65) Prior Publication Data
US 2022/0066759 A1 Mar. 3, 2022

(51) Int. Cl.
G06F 9/44 (2018.01)
*G06F 8/41* (2018.01)
*G06F 9/52* (2006.01)

(52) U.S. Cl.
CPC ............. *G06F 8/458* (2013.01); *G06F 9/52* (2013.01)

(58) Field of Classification Search
CPC .................................. G06F 8/458; G06F 9/52
USPC ....................................................... 717/149
See application file for complete search history.

(56) References Cited

U.S. PATENT DOCUMENTS

| 5,960,200 | A | 9/1999 | Eager et al. |
| 6,985,846 | B1 | 1/2006 | Dunlavey |
| 8,347,272 | B2 * | 1/2013 | Sugawara ................ G06F 8/75 717/133 |
| 8,490,115 | B2 * | 7/2013 | Torgersen ............ G06F 9/4498 719/320 |
| 9,092,564 | B2 * | 7/2015 | Wischik ................ G06F 9/4484 |
| 10,733,010 | B2 * | 8/2020 | Kasha ........................ G06F 8/71 |
| 2002/0166000 | A1 | 11/2002 | Rossi et al. |
| 2003/0056205 | A1 * | 3/2003 | Miloushev ................ G06F 8/70 717/162 |
| 2003/0135850 | A1 * | 7/2003 | Miloushev ............ G06F 9/4812 717/165 |
| 2005/0086650 | A1 * | 4/2005 | Yates, Jr. ............ G06F 9/45533 717/139 |
| 2005/0246692 | A1 | 11/2005 | Poteryakhin et al. |

(Continued)

OTHER PUBLICATIONS

Paolo Severini, "Async-Await in C++", 2014, Blog at Wordpress.com, 16 pages. (Year: 2014).*

(Continued)

*Primary Examiner* — Ted T. Vo
(74) *Attorney, Agent, or Firm* — Workman Nydegger

(57) ABSTRACT

Reuse of a thread-local return data structure to prevent a return data structure from being allocated every time asynchronous functions return. The system returns thread operation from the asynchronous function back to the caller function in a manner that the return data structure can be reused for future asynchronous function returns within that same thread. To do so, the system first accesses data that was generated by the asynchronous function in response to the caller function placing the function call to the asynchronous function. To determine if reuse is appropriate, the system determines that the caller function will use the return data structure as populated only once. If so, the system populates the reusable thread-local return data structure and returns that data structure to the caller.

20 Claims, 9 Drawing Sheets

(56) References Cited

U.S. PATENT DOCUMENTS

| | | | |
|---|---|---|---|
| 2006/0059496 | A1 | 3/2006 | Joy et al. |
| 2011/0258594 | A1 | 10/2011 | Syme et al. |
| 2012/0246624 | A1 | 9/2012 | Halliday et al. |
| 2013/0055223 | A1 | 2/2013 | Xu |
| 2013/0074092 | A1 | 3/2013 | Gounares et al. |
| 2013/0104148 | A1* | 4/2013 | Torgersen ............. G06F 9/4484 719/320 |
| 2016/0094636 | A1 | 3/2016 | Carr et al. |
| 2016/0110170 | A1 | 4/2016 | Miller et al. |
| 2019/0187965 | A1 | 6/2019 | Toub |
| 2019/0265956 | A1 | 8/2019 | Toub et al. |
| 2020/0125364 | A1 | 4/2020 | Österlund |
| 2020/0210156 | A1 | 7/2020 | Toub et al. |
| 2021/0336622 | A1 | 10/2021 | Young et al. |
| 2022/0050669 | A1 | 2/2022 | Wrighton et al. |

OTHER PUBLICATIONS

Sergey, "Dissecting the Async Methods in C#", 2017, Microsoft Developer Support, devblogs.microsoft.com, 7 pages. (Year: 2017).*
Kahlon et al., "Static Data Race Detection for Concurrent Programs with Asynchronous Calls", 2009, ACM, pp. 13-22. (Year: 2009).*
"Non Final Office Action Issued in U.S. Appl. No. 16/991,892", dated May 6, 2021, 18 Pages.
Knapp, et al., "Model Checking and Code Generation for UML State Machines and Collaborations", In Proceedings of 5th Wsh. Tools for System Design and Verification, Jan. 2002, pp. 59-64.
Risler, et al., "Formal Behavior Specification of Multi-Robot Systems Using Hierarchical State Machines in XABSL", In Proceedings of the AAMAS08-Workshop on Formal Models and Methods for Multi-Robot Systems, May 13, 2008, 7 Pages.
"International Search Report and Written Opinion Issued in PCT Application No. PCT/US21/029769", dated Aug. 18, 2021, 13 Pages.
"Notice of Allowance Issued In U.S. Appl. No. 16/991,892", dated Dec. 2, 2021, 10 Pages.
Goren, et al., "Checking Sequence Generation for Asynchronous Sequential Elements", In Proceedings of the International Test Conference (IEEE Cat. No. 99CH37034), Sep. 30, 1999, pp. 406-413.
Syme, et al., "The F# Asynchronous Programming Model", In the Book of Practical Aspects of Declarative Languages, Lecture Notes in Computer Science, vol. 6539, Jan. 24, 2011, 15 Pages.
"International Search Report and Written Opinion Issued in PCT Application No. PCT/US2021/030992", dated Aug. 19, 2021, 14 Pages.
Wagner, et al., "Await Operator—C# Reference", Retrieved From: https://web.archive.org/web/20200720224108/https://docs.microsoft.com/en-us/dotnet/csharp/language-reference/operators/await, Jul. 13, 2020, 4 Pages.
Wagner, et al., "Task Asynchronous Programming Model", Retrieved From: https://web.archive.org/web/20200828122319/https://docs.microsoft.com/en-us/dotnet/csharp/programming-guide/concepts/async/task-asynchronous-programming-model, Aug. 19, 2020, 11 Pages.
"Notice of Allowance Issued in U.S. Appl. No. 16/991,892", dated Mar. 2, 2022, 9 Pages.
Leucker, et al., "TeSSLa: Runtime Verification of Non-Synchronized Real-Time Streams", In Proceedings of Proceedings of the 33rd Annual ACM Symposium on Applied Computing, Apr. 9, 2018, pp. 1925-1933.
"Notice of Allowance Issued in U.S. Appl. No. 16/991,892", dated Apr. 18, 2022, 10 Pages.
Campanoni, et al., "A Parallel Dynamic Compiler for CIL Bytecode", In Journal of ACM SIGPLAN Notices, vol. 43, Issue 4, Apr. 2008, pp. 11-20.

* cited by examiner

THREAD-LOCAL RETURN STRUCTURE FOR ASYNCHRONOUS STATE MACHINE

BACKGROUND

One type of programming is asynchronous programming in which code can be represented in a sequential order, but the code executes in an asynchronous fashion. That is, at runtime, a caller function places a function call to an asynchronous function. That asynchronous function may complete its operation and return an expected value to the caller function, in which case the asynchronous function is said to have returned synchronously. On the other hand, the asynchronous function may pause mid-operation awaiting the occurrence of a particular event. However, even in that case, the asynchronous function still returns though providing enough information so that the runtime can resume the asynchronous function upon the occurrence of the event. In this case, the asynchronous function is said to have returned asynchronously.

In either case, the asynchronous function returns a return data structure of a particular type. As an example, in C# code, asynchronous functions can be declared (using "async") causing the asynchronous function to be executed using a C# generated async state machine. Such state machines return a data structure called a "Task" that has a particular schema. Task<T> is a task object that is used to return a generic type. In any case, the return of such an object causes allocation of a Task<T> object in the heap of the computing system.

To avoid heap allocation of a Task object, some runtimes have a predetermined set of Task objects pre-allocated in the heap, each corresponding to a common returned value. For instance, there might be an allocation of a Task object populated with a "True" Boolean value, a Task object populated with a "False" Boolean value, a Task populated with a Null value, Task objects for each of the integers 0 through 9, and so forth. In this case, if a returned value is one of these common values, then the pre-allocated Task object for that value can be found and returned, avoiding allocation of a new Task object in the heap. If the returned value is not one of the common values, a new Task object would be allocated, populated with the value, and then returned.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The principles described herein relate to reuse of a thread-local return data structure in order to prevent a return data structure from being allocated every time asynchronous functions return synchronously. The principles described herein operate in a computing environment in which one or more caller functions place one or more function calls to one or more asynchronous functions.

As an example, as part of a thread, a particular caller function places a function call to an asynchronous function. In accordance with some embodiments described herein, a computing system synchronously returns thread operation from the asynchronous function back to the caller function using a return data structure. However, the thread operation is returned in a manner that the return data structure can be reused for future asynchronous function returns within that same thread.

To do so, the computing system (e.g., a runtime) first accesses data that was generated by the asynchronous function in response to the caller function placing the function call to the asynchronous function. The computing system determines that the data is to be returned within a return data structure of a particular type to the caller function. The computing system then determines that the asynchronous function is returning synchronously, which means that the asynchronous function has completed its operation and thus does not need to be rescheduled to resume. The computing system then determines that the caller function will use the return data structure as populated only once.

In response, the computing system allocates a thread-local return data structure within the heap of the computing system, populates the thread-local return data structure with the accessed data, and returns the populated thread-local return data structure to the caller function. The caller function will use the return data structure only once, but the computing system will still refrain from removing the thread-local return data structure from the heap. Instead, the thread-local return data structure remains in the heap to be reused upon future returns from asynchronous functions within the thread.

In accordance with some embodiments described herein, regardless of how or when the reusable thread-local return data structure is first allocated in the heap, that thread-local return data structure is reused. As an example, when an asynchronous function later is to synchronously return within a thread, the computing system determines that the data is to be returned within a return data structure of a particular type to the caller function. Then, the computing system determines that the asynchronous function is returning synchronously, and that the caller function will use the return data structure only once. In response, the computing system finds the pre-allocated thread-local return data structure of that particular type within the heap of the computing system, populates that return data structure with the accessed data, and returns the return data structure to the caller function. Again, once the caller function has used the return data structure, the reusable thread-local return data structure remains on the heap.

In this way, the computing system avoids having to allocate a return data structure on the heap every time an asynchronous function synchronously returns, thereby making more efficient use of computing resource when synchronously returning from asynchronous functions. This may be particularly advantageous if that data is to be returned down multiple levels in a stack in data structures of the same type, as that would typically involve reallocating a return data structure in the heap each time the data is passed down the stack. Instead, the same return data structure could be reused each time the data is passed down the stack.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

Figure 1:
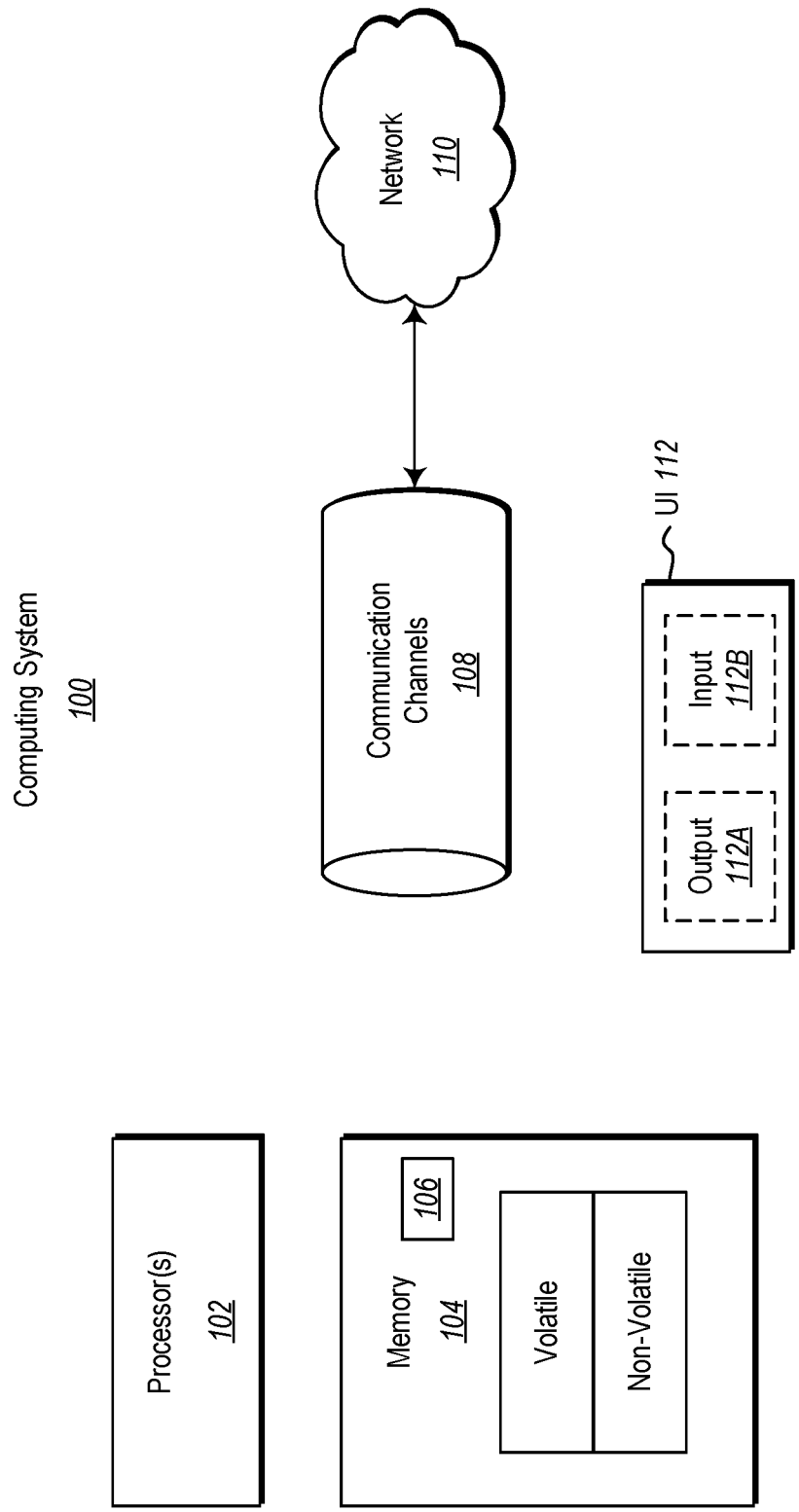
FIG. 1 illustrates an example computing system in which the principles described herein may be employed.

The principles described herein relate to reuse of a thread-local return data structure in order to prevent a return data structure from being allocated every time asynchronous functions return synchronously. The principles described herein operate in a computing environment in which one or more caller functions place one or more function calls to one or more asynchronous functions.

As an example, as part of a thread, a particular caller function places a function call to an asynchronous function. In accordance with some embodiments described herein, a computing system synchronously returns thread operation from the asynchronous function back to the caller function using a return data structure. However, the thread operation is returned in a manner that the return data structure can be reused for future asynchronous function returns within that same thread.

To do so, the computing system (e.g., a runtime) first accesses data that was generated by the asynchronous function in response to the caller function placing the function call to the asynchronous function. The computing system determines that the data is to be returned within a return data structure of a particular type to the caller function. The computing system then determines that the asynchronous function is returning synchronously, which means that the asynchronous function has completed its operation and thus does not need to be rescheduled to resume. The computing system then determines that the caller function will use the return data structure as populated only once.

In response, the computing system allocates a thread-local return data structure within the heap of the computing system, populates the thread-local return data structure with the accessed data, and returns the populated thread-local return data structure to the caller function. The caller function will use the return data structure only once, but the computing system will still refrain from removing the thread-local return data structure from the heap. Instead, the thread-local return data structure remains in the heap to be reused upon future returns from asynchronous functions within the thread.

In accordance with some embodiments described herein, regardless of how or when the reusable thread-local return data structure is first allocated in the heap, that thread-local return data structure is reused. As an example, when an asynchronous function later is to synchronously return within a thread, the computing system determines that the data is to be returned within a return data structure of a particular type to the caller function. Then, the computing system determines that the asynchronous function is returning synchronously, and that the caller function will use the return data structure only once. In response, the computing system finds the pre-allocated thread-local return data structure of that particular type within the heap of the computing system, populates that return data structure with the accessed data, and returns the return data structure to the caller function. Again, once the caller function has used the return data structure, the reusable thread-local return data structure remains on the heap.

In this way, the computing system avoids having to allocate a return data structure on the heap every time an asynchronous function synchronously returns, thereby making more efficient use of computing resource when synchronously returning from asynchronous functions. This may be particularly advantageous if that data is to be returned down multiple levels in a stack in data structures of the same type, as that would typically involve reallocating a return data structure in the heap each time the data is passed down the stack. Instead, the same return data structure could be reused each time the data is passed down the stack.

Because the principles described herein are performed in the context of a computing system, some introductory discussion of a computing system will be described with respect to FIG. 1. Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 includes at least one hardware processing unit 102 and memory 104. The processing unit 102 includes a general-purpose processor. Although not required, the processing unit 102 may also include a field programmable gate array (FPGA), an application specific integrated circuit (ASIC), or any other specialized circuit. In one embodiment, the memory 104 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, virtual or augmented reality, holograms and so forth. Examples of input mechanisms 112B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "MC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

Figure 2:
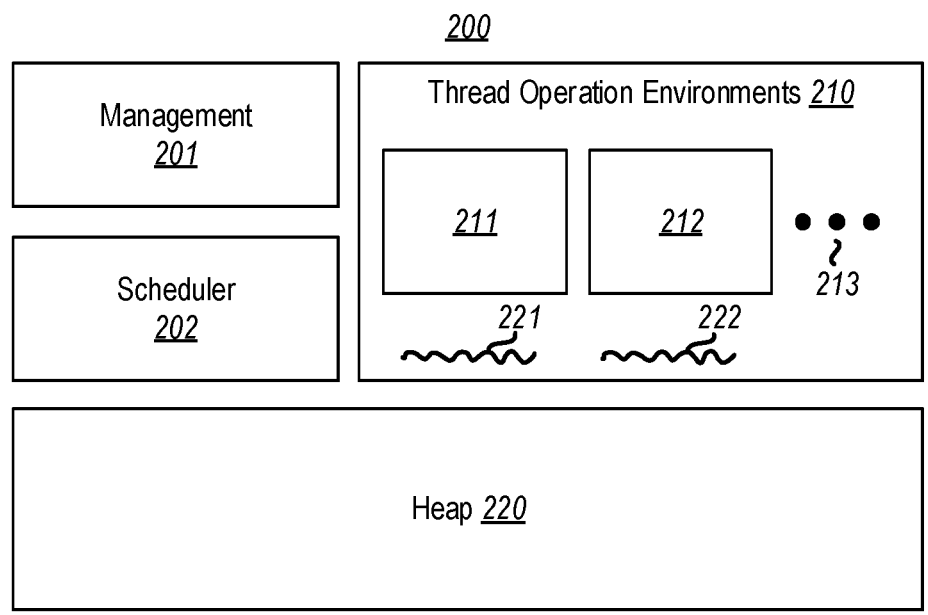
FIG. 2 illustrates an operation environment in which the principles described herein may operate, and which includes a management component, a scheduler component, thread operation environments, and a heap.

FIG. 2 illustrates an operation environment 200 that may operate within the computing system 100 described above with respect to FIG. 1. The operation environment 200 includes a management component 201, a scheduler component 202, thread operation environments 210, and a heap 220. Each of the management component 201 and the scheduler component 202 may be structured as described above from the executable component 106 of FIG. 1. The operation of the management component 201 will be described further below.

A thread represents a sequence of execution that operates within a particular thread environment. Multi-threaded systems allow for multiple sequences of execution, each having their own environment. For instance, the thread operation environments 210 are illustrated as including a first thread operation environment 211 for a first thread 221, and a second thread operation environment 212 for a second thread 222, with the ellipsis 213 representing that there may be any number of threads operating on the computing system limited only by the capabilities of the computing system, its processing units, and its operating system. The number of threads operating within a computing system can vary dynamically over time as new threads start execution, and old threads complete execution. The scheduler component 202 assigns the different threads to a processor cores and/or times.

Each thread operation environment can have its own dedicated variables called "thread-local" variables that only the corresponding thread can access in accordance with access permissions of the thread-local variables. For instance, the first thread operation environment 211 has visibility on the thread-local variables of the first thread 221, but not the thread-local variables of the second thread 222. Likewise, the second thread operation environment 212 has visibility on the thread-local variables of the second thread 222, but not the thread-local variables of the first thread 221. However, multiple thread operation environments can have visibility on non-thread-local variables. As an example, both the first thread 221 and the second thread 222 have visibility and operate upon non-thread-local variables.

Whether thread-local or not, the data structures representing variables are allocated on the heap 220. The heap 220 may be a portion of the memory of the computing system. For instance, when the operation environment 200 is on the computing system 100 of FIG. 1, the heap 220 is within the memory 104 of computing system 100.

Figure 3:
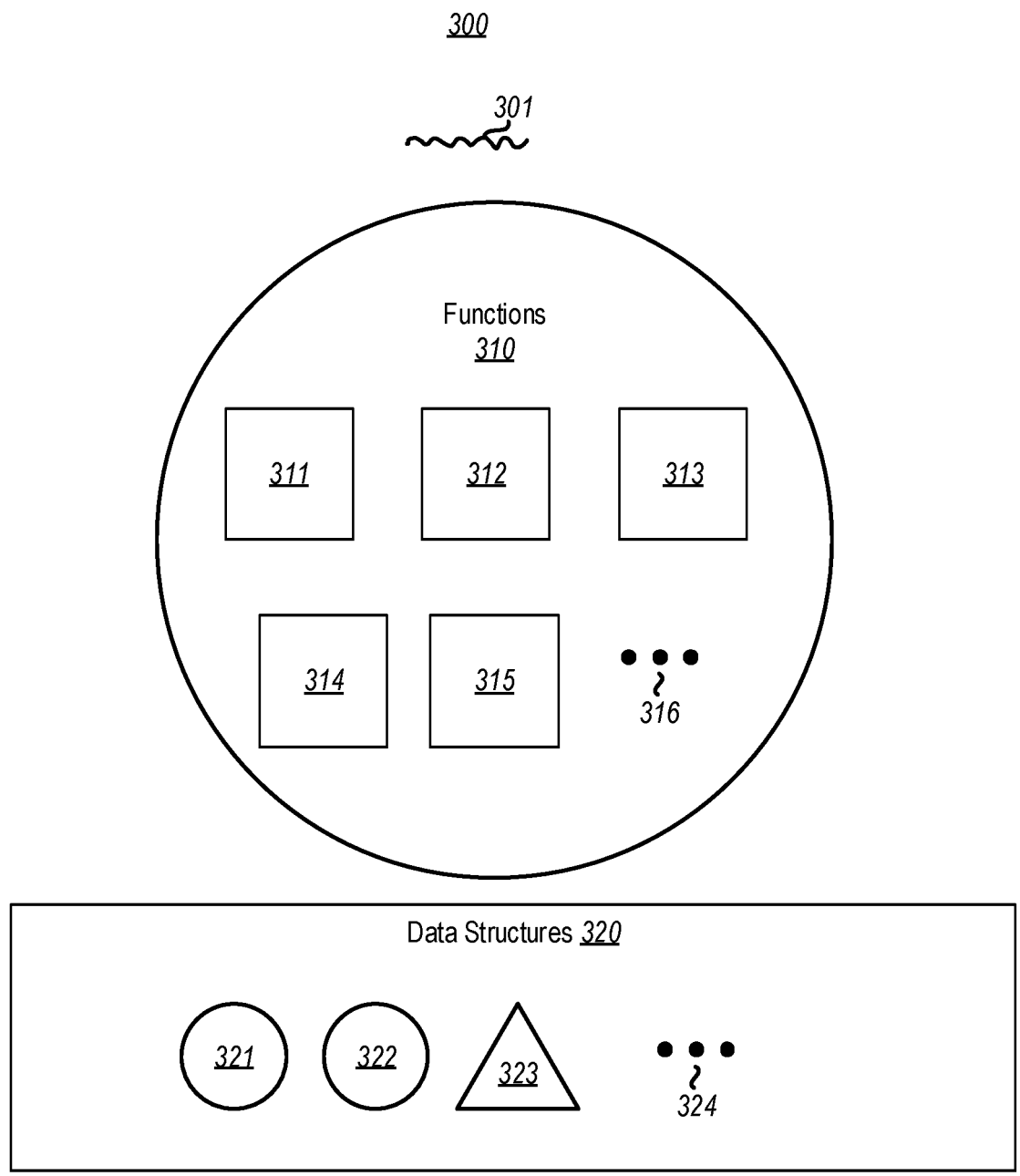
FIG. 3 illustrates a thread operation environment that includes functions and data structures that are visible to a particular thread.

FIG. 3 illustrates a thread operation environment 300 that includes functions and data structures that are visible to a particular thread 301. As an example, if the thread 301 is the first thread 221 of FIG. 2, the thread operation environment 300 is an example of the first thread operation environment 211 of FIG. 2. If the thread 301 is the second thread 222 of FIG. 2, the thread operation environment 300 is an example of the second thread operation environment 212 of FIG. 2.

The thread operation environment 300 includes a plurality of functions 310 and data structures 320 that are each visible to the corresponding thread 301. For instance, by way of example only, the functions 310 are illustrated as including five functions 311 through 315, though the ellipsis 316 represents that a thread operation environment may include any number of functions, and the number of functions within a thread operation environment may change dynamically over time as the thread creates and deletes function instances.

The data structures 320 represent data structures present within the heap 220 and that are visible to the corresponding thread 301. The data structures 320 are illustrated as including three data structures 321 through 323, although the ellipsis 324 represents that the thread operation environment 300 may have visible any number of data structures, and the number of data structures may change dynamically over time as data structures visible to the thread 301 are created and deleted. The data structures 320 may be of different types as represented by the data structures 321 through 323 having different shapes. As an example, the data structures 321 and 322 are of the same type as symbolized by them being illustrated as circles. However, the data structure 323 is of a different type as symbolized by it being illustrated as a triangle.

Figure 4:
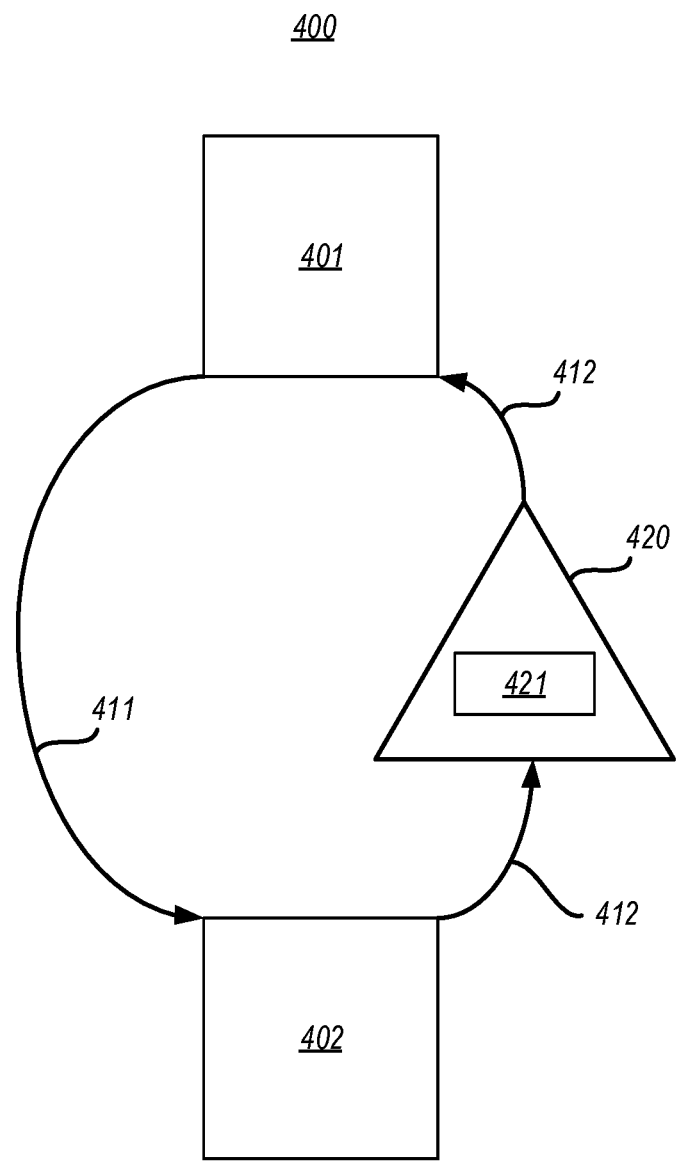
FIG. 4 illustrates a caller function placing a function call to an asynchronous callee function, and the callee function synchronously returning with a return data structure containing data.

Within a given thread operation environment, one function may place a function call to another function, and potentially also receive resulting data. For example, FIG. 4 illustrates two functions 401 and 402. Function 401 places a function call 411 to the function 402. The function 401 will be referred to herein as a "caller function" as it is the function that places the function call 411. The function 402 will be referred to as the "callee function" as it is the function that receives the function call 411. With respect to the function call 411, the function 401 is the caller, and the function 402 is the callee. However, with respect to other function calls not shown, the function 401 may be a callee. And with respect to other function calls not shown, the function 402 may be a caller. In accordance with the principles described herein, the callee function is an asynchronous function.

The asynchronous function 402 thereafter synchronously returns (as represented by arrow 412) a call return to the caller function 401. In the illustrated case, the asynchronous function 402 returns a return data structure 420 of a particular type. This particular type is represented by the data structure 420 having a particular triangular shape. As an example, the return data structure 420 may be the data structure 323 of FIG. 3. For instance, asynchronous functions running in the common language runtime returns an object of type "Task". The asynchronous function 402 populated the return data structure 420 with data 421 that the caller function 401 can then use. Because the function return 412 is a synchronous function return, the data 421 is the final result that is produced by the asynchronous function 402. In other words, the data 421 is not some intermediate result necessitating that the asynchronous function be scheduled to resume upon the occurrence of some future event in order to later generate the final result.

Figure 5:
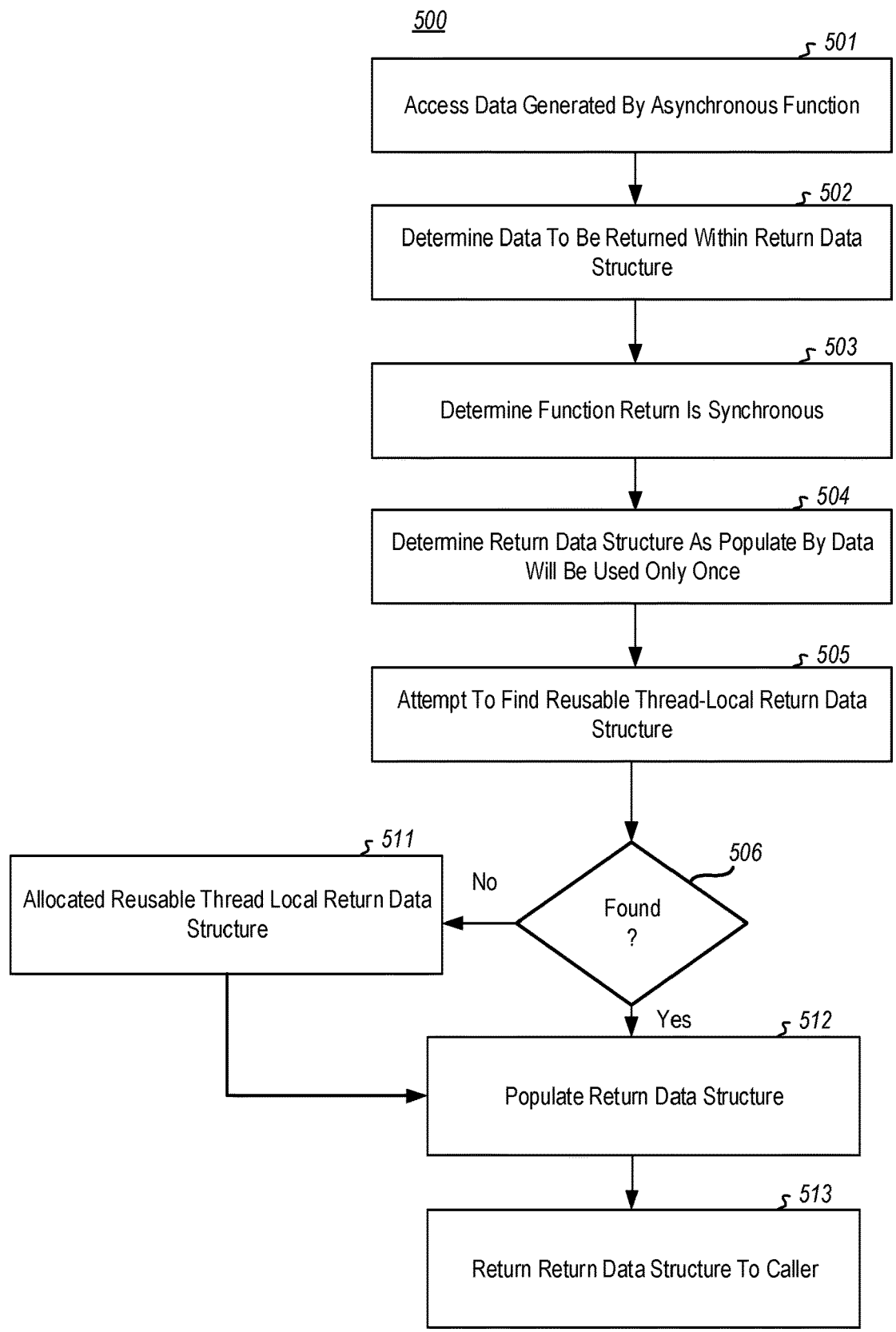
FIG. 5 illustrates a flowchart of a method for synchronously returning thread operation from an asynchronous function to a caller function using a return data structure, in accordance with the principles described herein.

FIG. 5 illustrates a flowchart of a method 500 performed by a computing system for returning thread operation from an asynchronous function to a caller function using a return data structure so that the return data structure can be reused for future asynchronous function returns within the thread. As an example, in an example described hereinafter, the computing system performs the method 500 for causing the call return 420 to be provided from the asynchronous function 402 to the caller function 401. The method 500 may be performed by a computing system, such as the computing system 100 of FIG. 1. As a specific example, the method 500 may be performed by the management component 201 of FIG. 2, which may be a runtime environment or a component of a runtime environment of the computing system 100.

The method 500 includes accessing data generated by an asynchronous function (act 501). For example, referring to FIG. 4, the computing system accesses the data 421 that was generated by the asynchronous function 402 as a final result in response to the caller function 401 placing the function call 411.

In addition, the computing system determines that the data is to be returned within a return data structure of a particular type to the caller function (act 502). Referring to the example of FIG. 2, the computing system determines that the data 421 is to be populated within a return data structure that is of a particular type (represented by the triangular shape). As an example, functions that are described as "async" in C# code are returned in the form of what is referred to as a "Task" object in C# code.

The computing system also determines that the function return is a synchronous function return (act 503). As an example, the "Task" object in C# is marked as complete when the Task object is synchronously returned from the asynchronous function. The computing system further dynamically determines that the caller function will use the return data structure as populated by the data only once (act 504). For instance, referring to FIG. 4, the computing system determines that the caller function 401 will use the return data structure 420 only once while populated with the data 421.

In response to determining that the caller function will use the return data structure only once as populated by the data, the computing system attempts to find a thread-local return data structure that has already been allocated within the heap (act 505). If the computing system successfully finds such a reusable return data structure ("Yes" in decision block 506), the computing system populates the thread-local return data structure with the accessed data (act 512), and returns that populated data structure (act 513). Otherwise, if the computing system does not find such a reusable return data structure ("No" in decision block 506), the computing system allocates the thread-local return data structure within the heap of the computing system (act 511), and only then populates the allocated thread-local return data structure with the accessed data (act 512), prior to returning the reusable return data structure to the caller function (act 513). In either case, as represented in FIG. 4, the caller function 401 receives the reusable thread-local return data structure 420 as populated with the return data 421.

Once the caller function 401 uses the return data structure 420, the caller function 401 thereafter has no more ability to use the return data structure 420, and may not even have visibility on the return data structure 420 at all. However, the thread-local return data structure 420 remains within the heap of the computing system. Accordingly, when the same or a different caller functions makes a function call to the same or a different asynchronous function, that same preallocated thread-local return data structure can be reused, with the computing system populating the new accessed data into the same thread-local return data structure.

Because the return data structure is thread-local, the computing system can verify with certainty whether the return data structure as populated by any given return data will be used only once. Once that is confirmed, and the computing system verifies that the caller function did use the return data structure that once, it is certain that no other function will use the return data structure until the method 500 is once again performed, causing new data from a new asynchronous function to be populated into the return data structure to a new caller function. Thus, the appearance of immutability is preserved from the perspective of any function within the thread operation environment. Yet, instead of having to allocate a return data structure every time an asynchronous function synchronously returns, the computing system only had to allocate the return data structure once. Furthermore, this capability exists regardless of the type of data that is populated into the return data structure. For example, in the language of C#, the particular type of the return data structure can be Task<T>, which allows for the return of any generic type of data.

The above description operates on the assumption that the computing system is capable of determining whether a return data structure is to be used only once. This description will now focus on ways that the computing system can make this determination. In one embodiment, the determination is made by a runtime compiler by finding a function that instructs the runtime environment to wait for the occurrence of a particular event. This may be accomplished if the intermediate code expresses such a wait intrinsic.

As described below, the language compiler may be structured such that the runtime compiler has visibility on such an await function. In that case, the runtime compiler may compile the await intrinsic to include a particular no-operation instructions in machine code. Such an instruction might include, for example, copying a processor register onto itself, or adding zero to the current value of a processor register. Such operations accomplish nothing and take very little processing power, thus they do not change the behavior of the machine code. However, they can be used as a signal to the runtime environment that the return data structure will indeed be used only once as populated by the data. A way in which visibility of the await function can be provided to the runtime compiler will now be described.

Figure 6:
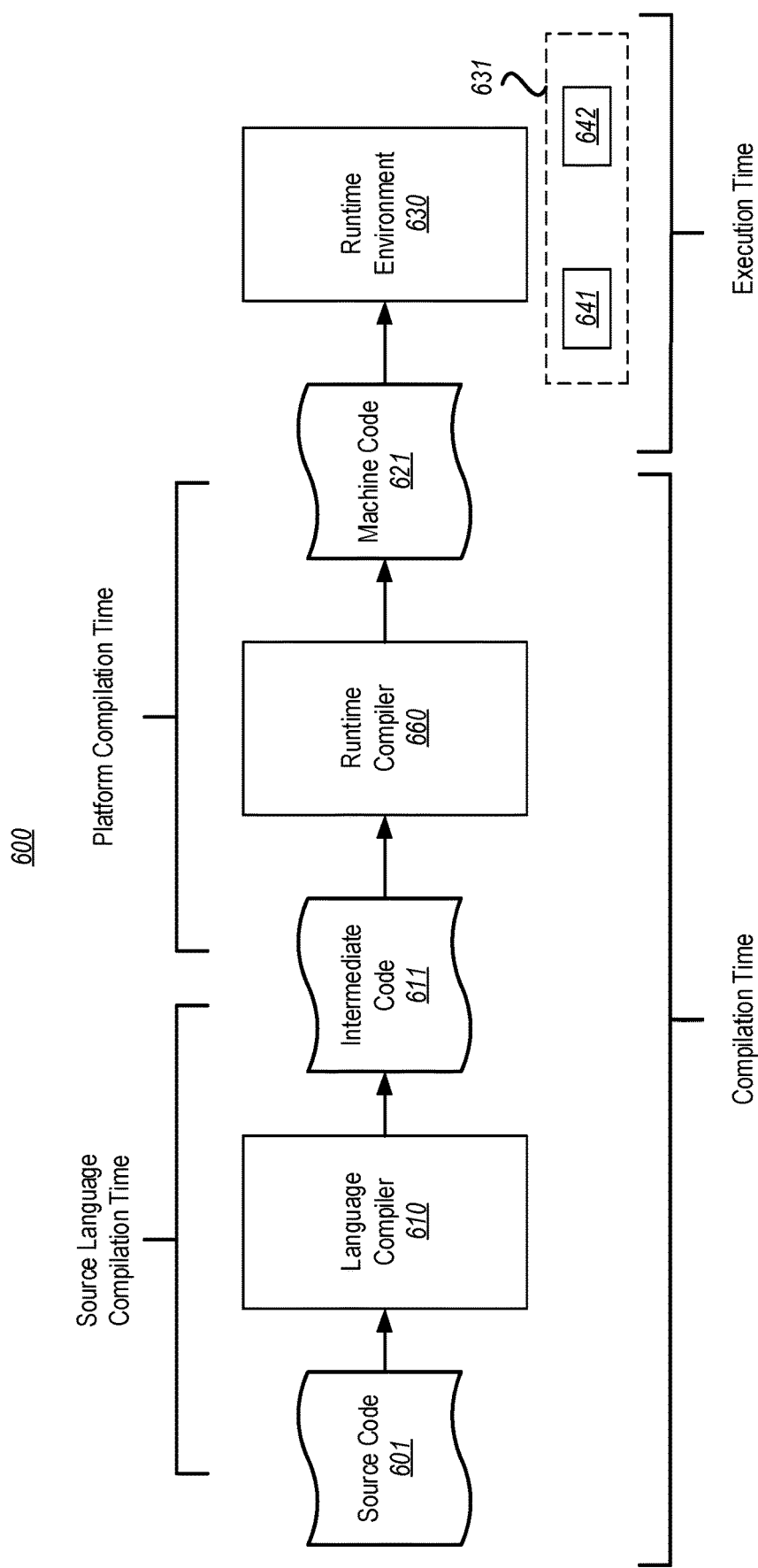
FIG. 6 illustrates a process flow associated with an example compilation and execution of software, including the compilation of intermediate code from source code, the compilation of machine code from that intermediate code, and the execution of that machine code in a runtime environment.

FIG. 6 illustrates a process flow 600 associated with an example compilation and execution of software. In the case of the process flow 600, compilation occurs in two distinct stages at two distinct times. Namely, compilation occurs first in a source language compilation stage at a source language compilation time, and thereafter compilation occurs in a platform compilation stage at a platform compilation time. In the example process flow 600 of FIG. 6, at source language compilation time, a language compiler 610 compiles source code 610 into intermediate code 611. At platform compilation time, a runtime compiler 620 compiles the intermediate code 611 into machine code 621.

After compilation, at execution time, the compiled code is executed by a runtime environment. As depicted in FIG. 6, at execution time, the runtime environment 630 executes the machine code 621 to accomplish within the runtime environment 630 the functionality original described in the source code 601. Each of the language compiler 610, the runtime compiler 620 and the runtime environment 630 may be structured as described above for the computing system 100 of FIG. 1. The runtime environment 630 may also include components 631 that are used to assist the runtime environment 630 in running asynchronous functions. As an example, the components 631 include components 641 and 642, an example of which will be described further below. If the runtime compiler 620 is a Just-in-Time (JIT) compiler, then runtime compilation occurs in preparation for imme-diate execution of the resulting machine code. However, the runtime compiler 620 may alternatively be an Ahead-of-Time compiler, in which case the resulting machine code can be executed well after platform compilation time.

The source code 601 is authored in a source code language and thus conforms to semantic rules defined by the source code language 601. Examples of source code languages include Java, C#, Pascal, Python, JavaScript, amongst many others. In general, source code language uses textual structures and semantic rules that are more intuitive to a human programmer to express software functionality. The language compiler 610 is configured to compile source code of a particular source code language. As examples, there are Java compilers, C# compilers, Pascal compilers, Python compilers, Javascript compilers, and compilers for all other source code languages. The language compiler 610 is considered a front-end compiler and may perform lexical, syntactic and semantic analysis to generate the intermediate code 611.

The intermediate code 611 is code format that can be executed across a broad spectrum of different platforms after compilation by an appropriate runtime compiler. That is, the runtime compiler for a particular platform will take into consideration that platform-specific runtime environment, and compile the intermediate code 611 into machine code that is targeted to, and optimized for, the corresponding platform. The intermediate code 611 may also be independent of the source code language that it was compiled from. However, intermediate code can be either source code language specific or source code language independent.

Examples of intermediate code include Byte Code which is specific to Java. There is also three-address code, which is source language independent. As another example, there is an intermediate language called "Common Intermediate Language" (or CIL) that is designed for runtime compilers used by the .NET framework. There can be different levels of intermediate language code—such as high level intermediate code which is closer to the source code, and low level intermediate code which is close to the machine code, and all levels in between. The principles described herein are not limited to a particular type of intermediate language, or whether such intermediate languages now exist or are to be developed in the future.

The use of intermediate code is helpful as it keeps the analysis portion of the compiler the same regardless of the nature of the platform in which the intermediate code will execute. Thus, a full compiler is not required for each unique system in which the code will operate. The runtime compiler can thus focus on optimization to a particular environment. In practice, source language compilation time often occurs prior to delivery of software for execution in a particular platform, whereas platform compilation time occurs after delivery of the software, once the characteristics of the platform in which the software will execute is known. In some embodiments, platform compilation time occurs at the same time as execution time in a just-in-time model. In other embodiments, platform compilation time can occur well in advance of the execution of the software within the runtime environment.

Figure 7:
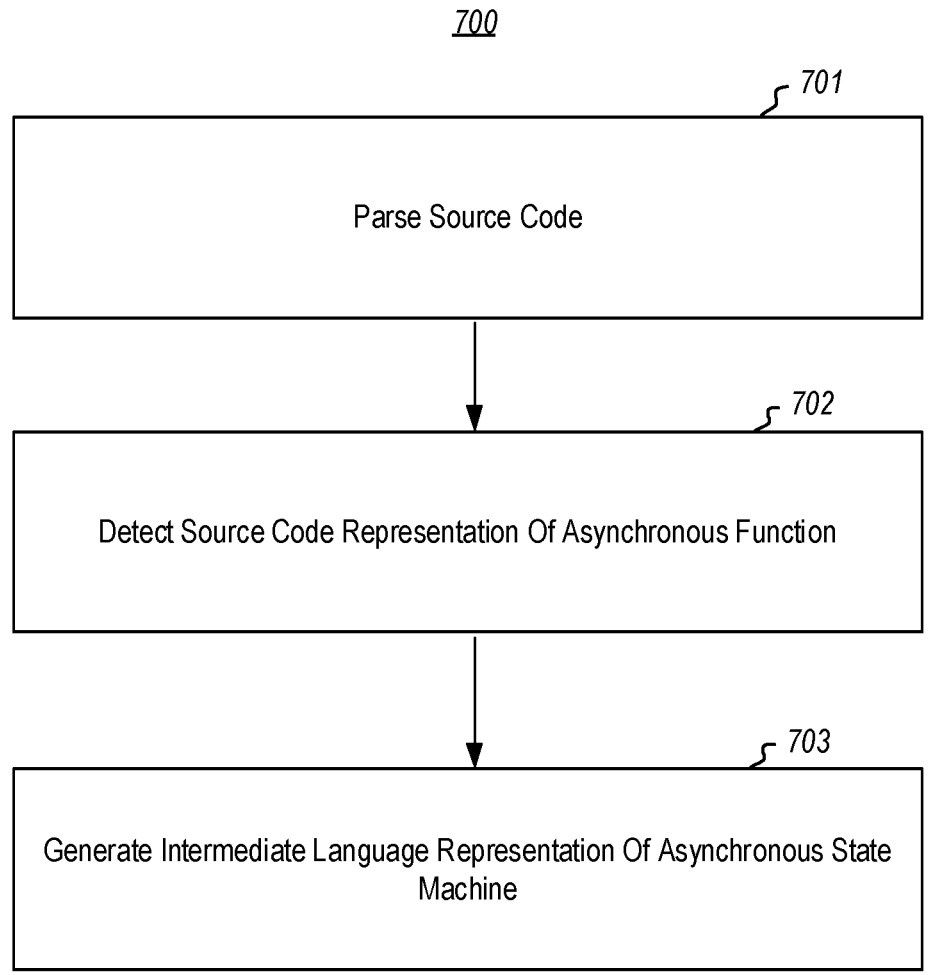
FIG. 7 illustrates a flowchart of a method for a language compiler to compile source code into intermediate code, in accordance with the principles described herein.

FIG. 7 illustrates a flowchart of a method 700 for a language compiler to compile source code into intermediate code, in accordance with the principles described herein. The method 700 may be performed by the language compiler 610 of FIG. 6. As an example, if the language compiler 610 is structured as described above for the computing system 100 of FIG. 1, there are computer-executable instructions stored in the memory 104 of the computing system 100 such that, if the computer-executable instructions are executed by the one or more processing units 102, the computing system 100 performs the method 700.

The method 700 includes parsing source code that conforms with a language of the language compiler (act 701). Referring to FIG. 2 as an example, the language compiler 610 parses the source code 601 using lexicological, syntactic and semantic rules of the source code language corresponding to the language compiler 610. This allows the language compiler to build an abstract syntax tree of the source code 601.

Figure 8:
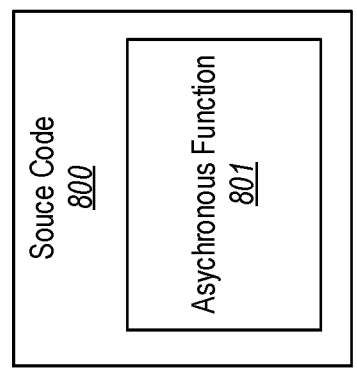
FIG. 8 schematically illustrates source code, which includes a source code representation of an asynchronous function.

In this process, suppose that the language compiler detects a source code representation of an asynchronous function that was represented within the source code (act 702). FIG. 8 schematically illustrates source code 800, which includes a source code representation of an asynchronous function 801. An "asynchronous function" is any function, method, object, or component that can be paused at one or more execution points, and then resume upon the occurrence of a specified event. The following is an example of source code drafted in C# that includes an asynchronous function called "DoStuff", and which has line numbering added for clarity and for future reference.

1. async Task<int> DoStuff(ObjectThatHasAsync oasync)
2. {
3. DateTime date=await oasync.DoOtherStuff( );
4. string str=await oasync.DateToString(date)
5. return Int32.Parse(str);
6.}

This example will be referred to as the "DoStuff" example herein. As shown in line 1, the DoStuff function receives an object called "oasync" which is of type "ObjectThatHasAsync", which is an object type that includes one or more asynchronous methods. The "DoStuff" function operates as described between the opening bracket on line 2 and the closing bracket on line 6. Specifically, the object includes a method called "DoOtherStuff" as well as a method called "DateToString", any one of which perhaps having to pause at some point waiting for an event to occur.

As shown in line 3, "DateTime date=await oasync.DoOtherStuff( );", which declares a parameter called "date" and being of type "DateTime". The term "await" identifies the method DoOtherStuff as being capable of returning either synchronously or asynchronously. Here, returning asynchronously means that the method was able to perform all of its processing and return an actual value (in this case "date" of type DateTime). Returning asynchronous means that the method paused and returned without a complete value, and can resume upon the occurrence of an event. As shown in line 4, "string str=await oasync.DateToString (date)" declares a parameter called "str" of type string. The term "await" identifies the method DateToString as also being capable of returning either synchronously or asynchronously. As shown in line 5, "return Int32.Parse(str);" causes the DoStuff method to return in Int32 representation of the value str of type string.

Figure 9:
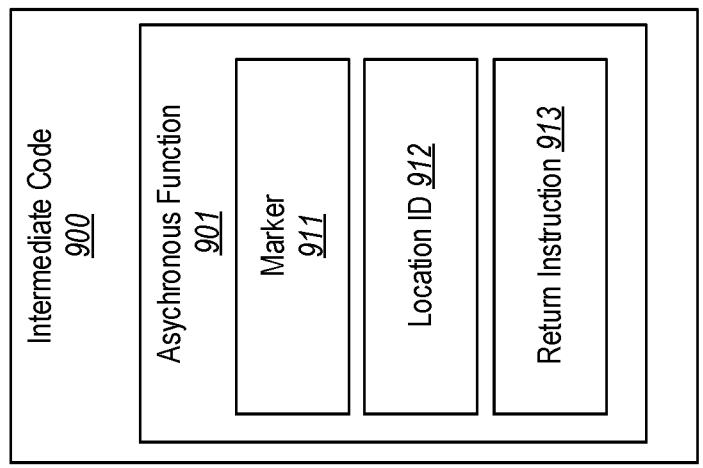
FIG. 9 illustrates an example of intermediate code that includes a runtime representation of the asynchronous state machine.

Returning to FIG. 7, in response to detecting that the source code includes a source code representation of an asynchronous function (act 702), the language compiler generates an intermediate language representation of an asynchronous state machine that corresponds to the asynchronous function (act 703). This declaration is structured to be interpreted by a runtime compiler as an instruction to declare an asynchronous state machine. FIG. 9 illustrates an example of an intermediate code 900 that includes an intermediate code representation 901 of the asynchronous state machine that describes the same functionality as the source code representation 801 of the asynchronous state machine.

The intermediate code 900 is an example of the intermediate code 611 of FIG. 6. Thus, the asynchronous function is visible to the runtime compiler (e.g., runtime compiler 620), and thus the runtime compiler can optimize performance of the asynchronous function. The intermediate code representation 901 of the asynchronous function includes three data structures 911, 912 and 913, which will now be described. The data structure 911 is a marker 911 that is structured to be interpretable by the runtime compiler as indicating that the asynchronous function can return asynchronously. Stated differently, the marker 911 is interpretable by the runtime compiler as an instruction to make available to a runtime of the asynchronous function one or more components that assist the asynchronous function to return asynchronously. Referring to FIG. 6, the components 631 may be made available to the runtime environment 630 in response to a marker 911 being present within the intermediate code representation 901 of the asynchronous function.

The data structure 912 is a location identifier 912 interpretable by the runtime compiler as identifying one or more portions at which the asynchronous function can pause. There may a location identifier 912 for each location at which the asynchronous function can pause. The data structure 913 is an instruction 913 that is structured to be interpretable by the runtime environment 930 as instructing how to return from the asynchronous function.

Returning to the DoStuff example, the source code for the DoStuff function could be compiled into the following intermediate code representation (with line numbers added for clarity and ease of reference).

1. [System.Runtime.CompilerServices.RuntimeGeneratedAsyncStateMachineAttribute]
2. Task<int> DoStuff(ObjectThatHasAsync oasync)
3. .locals
4. (DateTime, string)
5. {
6. ldarg.1
7. callvirt instance Task<DateTime> ObjectThatHasAsync.DoOtherStuff( )
   // Call to method that returns task.
8. call !!0 RuntimeHelpers.Await<DateTime>(Task<!!0>)
   // Await intrinsic, that will convert this method into a state machine if necessary.
9. stloc.0
10. ldarg.1
11. ldloc.0
12. callvirt instance Task<string> ObjectThatHasAsync.DateToString(DateTime)
    // Call to method that returns task.
13. call !!0 RuntimeHelpers.Await<string>(Task<!!0>)
    // Await intrinsic, that will convert this method into a state machine if necessary.
14. stloc.1
15. ldloc.1
16. call int32 System.Int32.Parse(string)
17. call Task<!!0> RuntimeHelpers.RuntimeGeneratedTaskTReturn <int>( )
18. ret
19.}

Line 1 is an example of marker 911 of FIG. 9, and is an intermediate code representation of an instruction to the runtime compiler to make available to the runtime components that can be used to perform the asynchronous function at runtime. For example, line 1 will cause components to be available that are used by the runtime to generate an asynchronous state machine. Such components include a pause component called "RuntimeHelpers.Await", which is later invoked in lines 8 and 13, and are each examples of the location identification 912 in FIG. 9. Such components also include a return component called "RuntimeHelpers.RuntimeGeneratedTaskTReturn", which is later invoked in line 17, which is an example of the return instruction 913 of FIG. 9. Referring to FIG. 6, the function 641 represents a pause component that instructs the runtime 630 on where the asynchronous function represented in the machine code 621 can pause. The function 642 represents a return component that instructs the runtime 630 on how to return from an asynchronous function "Task<int> DoStuff(ObjectThatHasAsync oasync)".

Line 2 identifies that source code function that the intermediate code corresponds to. In this case, the intermediate code is an intermediate code representation of the source code ". Lines 3 and 4 declare the local variables of type DateTime and String. The opening bracket on line 5 and the closing bracket on line 19 and define the extend of the intermediate code that defines the function identified in line 2. Lines 6 to 9 of the intermediate code is the intermediate code representation of the source code from line 3 of the source code. Lines 10 to 14 of the intermediate code is the intermediate code representation of the source code from line 4 of the source code. Lines 15 to 18 of the intermediate code is the intermediate code representation of the source code from line 5 of the source code. This patent application will hereinafter refer to this intermediate code of the DoStuff example.

Figure 10:
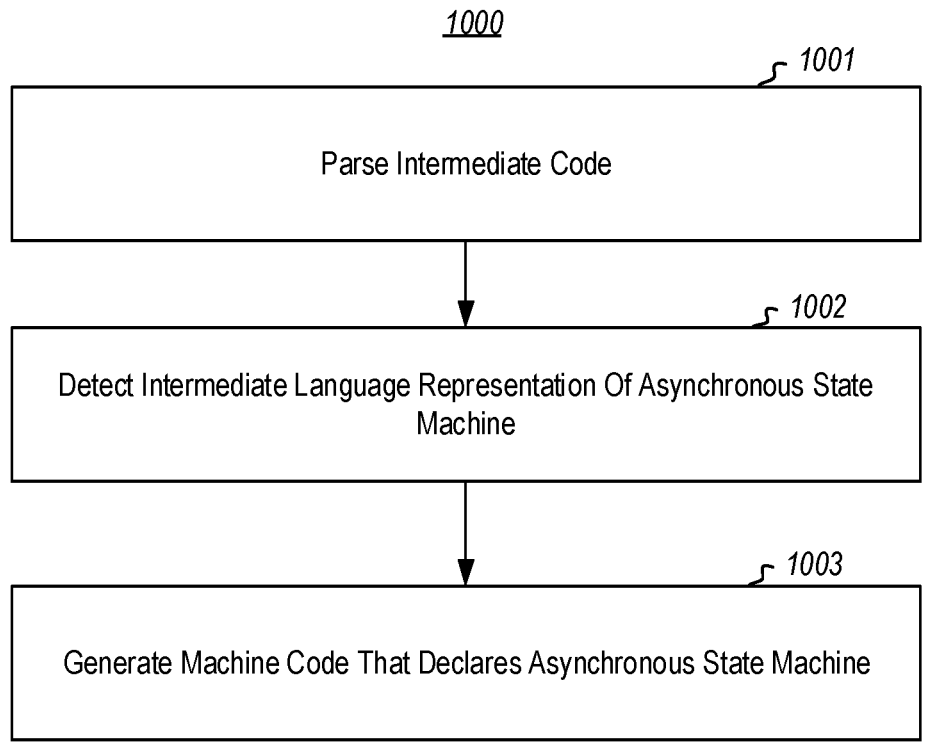
FIG. 10 illustrates a flowchart of a method for compiling intermediate code into binary code that is executable by a runtime.

FIG. 10 illustrates a flowchart of a method 1000 for compiling intermediate code into binary code that is executable by a runtime environment, in accordance with the principles described herein. The method 1000 may be performed by the runtime compiler 620 of FIG. 2. As an example, if the runtime compiler 620 is structured as described above for the computing system 100 of FIG. 1, there are computer-executable instructions stored in the memory 104 of the computing system 100 such that, if the computer-executable instructions are executed by the one or more processing units 102, the computing system 100 performs the method 1000.

The method 1000 includes parsing intermediate code that is structured to be interpreted by a runtime compiler (act 1001). As an example, the runtime compiler may be the runtime compiler 620 of FIG. 6, which may be part of the runtime environment 630 of a computing system. While parsing the intermediate language code (act 1001), the runtime compiling detects an intermediate language representation of an asynchronous state machine from the parsed intermediate code (act 1002). For instance, when parsing the intermediate code of the DoStuff example, there are two times that the runtime compiler would detect, once at line 7 when encountering "Task<DateTime> ObjectThatHasAsync.DoOtherStuff( )" and once at line 10 when encountering "Task<string> ObjectThatHasAsync.DateToString(DateTime)". The runtime compiler then generates machine language code that, when executed by the runtime environment, formulates an asynchronous state machine in the memory of the computing system (act 1003). It is at this point that the runtime compiler 620 can also insert the no-operation instruction in association with the other machine code associated with each await instruction (at lines 8 and 13).

Figure 11:
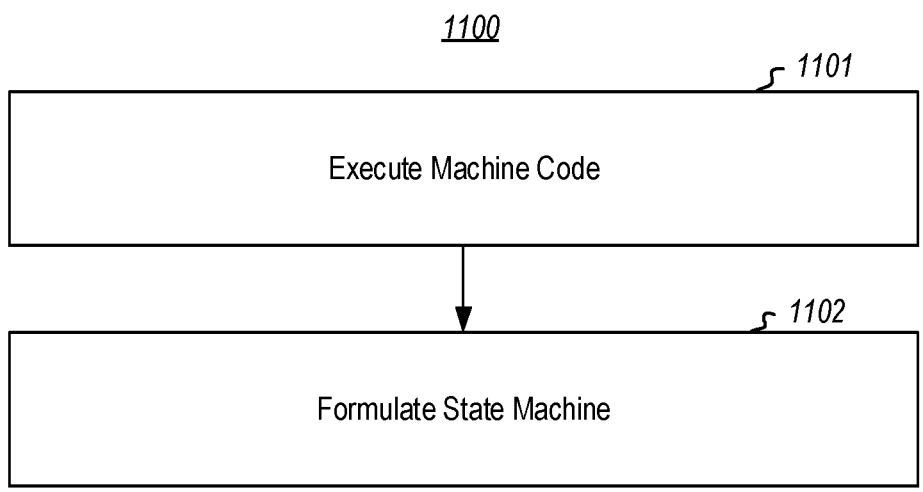
FIG. 11 illustrates a flowchart of a method for executing the asynchronous function by executing machine language code.

FIG. 11 illustrates a flowchart of a method 1100 for executing the asynchronous function by executing machine language code, in accordance with the principles described herein. Here, the method 1100 may be performed by the runtime environment 630 of FIG. 6. As an example, if the runtime environment 630 is structured as described above for the computing system 100 of FIG. 1, there are computer-executable instructions stored in the memory 104 of the computing system 100 such that, if the computer-executable instructions are executed by the one or more processing units 102, the computing system 100 performs the method 1100. If the runtime compiler is a Just-in-Time compiler, then the method 1100 would be performed right after the machine code is generated in the method 1000 of FIG. 10. However, in Ahead-of-Time compilation, the machine code may not be executed for some time.

In accordance with the method 1100, the runtime environment executes a binary representation of the intermediate code. For example, referring to FIG. 6, the runtime environment 630 executes the machine code 621 (act 1101). Because the machine code is structured to cause the runtime environment to formulate a state machine representation of the asynchronous function (e.g., in act 1003 of method 1000), the execution of the machine code (act 1101) causes the runtime environment to formulate the state machine. More details about how this could be accomplished will now be described with respect to the intermediate code of the DoStuff example.

Upon executing the machine code that the runtime compiler compiled from line 1 of the intermediate code, the runtime environment imports the functions that are within the System.Runtime.CompilerServices library corresponding to the .RuntimeGeneratedAsyncStateMachineAttribute attribute. These include at least the functions identified as "RuntimeHelpers.Await" and "RuntimeHelpers.RuntimeGeneratedTaskTReturn".

Upon executing the machine code compiled from line 7 "Task<DateTime> ObjectThatHasAsync.DoOtherStuff( )" of the intermediate code, the runtime environment will cause the DoOtherStuff method to be called, and such will return with a task that is called in the intermediate code "Task<DateTime>". Upon executing the machine code compiled from line 8 "RuntimeHelpers.Await<DateTime> (Task<!!0>)", the runtime environment determines whether the method has returned a completed value (e.g., an actual DateTime value), and if it has, it allows execution to proceed. In this case, the Task<DateTime> returns an actual DateTime value.

However, if the runtime determines that the method has returned to await an event, the execution of the binary corresponding to line 8 causes the DoStuff function to pause, constructs a state machine that will allow the DoStuff function to resume upon the occurrence of a specified event, causes the DoStuff function to return with the state machine, and schedules the DoStuff function to resume (by causing the state machine to continue) upon the occurrence of the event. As part of the construction of the state machine, state may be saved to the runtime environment that may later be loaded in order to resume operation of the DoStuff method at the point at which it was paused.

Similarly, upon executing the machine code compiled from line 12 "Task<string> ObjectThatHasAsync.DateToString(DateTime)" of the intermediate code, the runtime environment will cause the DateToString method to be called with a completed value from the DoOtherStuff method (which is the DateTime value). Upon executing the machine code compiled from line 12 "RuntimeHelpers.Await<string>(Task<!!0>)", the runtime environment determines whether the method has returned a completed value (e.g., an actual String value), and if it has, it allows execution to proceed (e.g., to return from the method DoStuff in line 18).

However, if the runtime environment determines that the method has returned to await an event, the execution of the binary corresponding to line 12 causes the DoStuff function to pause, constructs a state machine that will allow the DoStuff function to resume upon the occurrence of a specified event, causes the DoStuff function to return with the state machine, and schedules the DoStuff function to resume (by causing the state machine to continue) upon the occurrence of the event.

However, suppose the execution of line 8 of the intermediate code has already caused a state machine to be constructed because the DoOtherStuff method also returned asynchronously. In that case, there would be no need to reconstruct the state machine. Instead, the state of the DoStuff method would be recorded back into the previously constructed state machine. Accordingly, the runtime environment would then record the state and just schedule the resumption of DoStuff method to occur upon the occurrence of the event.

Suppose that the DoStuff function is returning a value synchronously. This would correspond to cases where during the execution of the method at lines 8 and 13, the called functions returned synchronously. In that case, at the execution of line 17, the function DoStuff is about to synchronously return a completed Task object, which is an example of the return data structure 420. At this point, since this return is a synchronous return (act 503), the runtime would determine that the return data structure 420 would be used only once (act 504), and thus could allocate or reuse a thread-local return data structure, and populate that thread-local data structure with the final data (act 512).

Accordingly, the principles described herein allow for an effective way for an asynchronous function to return without having to re-allocate a return data structure every time that asynchronous functions return. Furthermore, the principles described herein may be employed to achieve this end regardless of whether the values returned are common values, or any generic value.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A method performed by a computing system for synchronously returning operation from an asynchronous function to a caller function using a return data structure so that the return data structure can be reused for future asynchronous function returns within a thread, the method comprising:

executing an asynchronous function in response to a caller function placing a function call to the asynchronous function, the asynchronous function configured to await one or more events and return a value in response to at least one of the one or more events;

returning, by the asynchronous function, a first value at a first time;

allocating a thread-local return data structure within a heap of the computing system;

populating the thread-local return data structure with the first value;

determining whether the caller function will use the first value only once; and in response to determining that the caller function will use the first value only once, returning, by the asynchronous function, a second value at a second time that is later than the first time;

reallocating the same thread-local return data structure within the heap of the computing system;

populating the same thread-local return data structure with the second value; and returning the populated thread-local return data structure to the caller function.

2. The method in accordance with claim 1, the determining that the caller function will use the return data structure only once as populated by the data, comprising:

determining that there is a no-operation instruction in a predetermined location within machine code of the calling function.

3. The method in accordance with claim 1, the determining that the caller function will use the return data structure only once as populated by the data, comprising:

determining that an await operation follows a calling instruction in intermediate code of the caller function.

4. The method in accordance with claim 1, the caller function being a first caller function, the asynchronous function being a first asynchronous function, the function call being a first function call, the method further comprising:

executing a second asynchronous function in response to a second caller function placing a second function call to the second asynchronous function;

returning, by the second asynchronous function, a third value at a third time that is later than the second time;

in response to determining that the first caller function will use the second value only once, allocating the same thread-local return data structure within a heap of the computing system;

populating the thread-local return data structure with the third value;

and in response to determining that the second caller function will use the third value only once, returning, by the second asynchronous function, a fourth value at a fourth time that is later than the third time;

reallocating the same thread-local return data structure within the heap of the computing system;

re-populating the same thread-local return data structure with the fourth value; and returning the re-populated thread-local return data structure to the second caller function.

5. The method in accordance with claim 4, the determining that the second caller function will use the return data structure as populated with the second data only once comprising:

determining that there is a no-operation instruction in a predetermined location within machine code of the second caller function.

6. The method in accordance with claim 5, the determining that the first caller function will use the return data structure as populated by the first data only once, comprising:

determining that there is a no-operation instruction in a predetermined location within machine code of the first caller function.

7. The method in accordance with claim 6, the first caller function being a different function than the second caller function.

8. The method in accordance with claim 7, the second asynchronous function being different than the first asynchronous function.

9. The method in accordance with claim 7, the second asynchronous function being the same as the first asynchronous function.

10. The method in accordance with claim 6, the first caller function being the same function as the second caller function.

11. The method in accordance with claim 10, the second asynchronous function being different than the first asynchronous function.

12. The method in accordance with claim 11, the second asynchronous function being the same as the first asynchronous function.

13. The method in accordance with claim 1, the method being performed by a runtime environment of a computing system.

14. A computing system for synchronously returning operation from an asynchronous function to a caller function without allocating a return data structure in a heap of the computing system, the computing system comprising:
   one or more processors; and
   one or more computer-readable hardware storage devices having stored thereon computer-executable instructions that are structured such that, when executed by the one or more processors, configure the computing system to perform at least:
      execute an asynchronous function in response to a caller function placing a function call to the asynchronous function, the asynchronous function configured to await one or more events and return a value in response to at least one of the one or more events; returning, by the asynchronous function, a first value at a first time;
      return, by the asynchronous function, a first value at a first time;
      allocate a thread-local return data structure within a heap of the computing system;
      populate the thread-local return data structure with the first value;
      determine whether the caller function will use the first value only once;
      in response to determining that the caller function will use the first value only once,
         return, by the asynchronous function, a second value at a second time that is later than the first time;
         reallocate the same thread-local return data structure within the heap of the computing system;
         populate the same thread-local return data structure with the second value; and
         return the populated thread-local return data structure to the caller function.

15. The computing system in accordance with claim 14, the determining that the caller function will use the return data structure only once as populated by the data, comprising:
   determining that there is a no-operation instruction in a predetermined location within machine code of the calling function.

16. The computing system in accordance with claim 14, the determining that the caller function will use the return data structure only once as populated by the data, comprising:
   determining that an await operation follows a calling instruction in intermediate code of the caller function.

17. The computing system in accordance with claim 14, configured to operate in a runtime environment.

18. A computing program product for compiling intermediate code into binary code that is executable by a runtime comprising one or more hardware storage devices having stored thereon computer-executable instructions that are structured such that, when executed, the computer-executable instructions configure a computing system to perform at least:
   execute an asynchronous function in response to a caller function placing a function call to the asynchronous function, the asynchronous function configured to await one or more events and return a value in response to at least one of the one or more events;
   return, by the asynchronous function, a first value at a first time;
   allocate a thread-local return data structure within a heap of the computing system;
   populate the thread-local return data structure with the first value;
   determine whether the caller function will use the first value only once; and
   in response to determining that the caller function will use the first value only once,
      return, by the asynchronous function, a second value at a second time that is later than the first time;
      reallocate the same thread-local return data structure within the heap of the computing system;
      populate the same thread-local return data structure with the second value; and
      returning the populated thread-local return data structure to the caller function.

19. The computer program product in accordance with claim 18, the determining that the caller function will use the return data structure only once as populated by the data, comprising:
   determining that there is a no-operation instruction in a predetermined location within machine code of the calling function.

20. The computer program product in accordance with claim 18, the determining that the caller function will use the return data structure only once as populated by the data, comprising:
   determining that an await operation follows a calling instruction in intermediate code of the caller function.

* * * * *